United States Patent [19]

Clark

[11] 4,076,706

[45] Feb. 28, 1978

[54] DISPERSE DYES FROM 2-CYANO-4,6-DINITROANILINE AND SELECTED 2(2'-ALKOXY-5'-ACYLAMIDOANILINO)ALKANES

[75] Inventor: Gary T. Clark, Kingsport, Tenn.

[73] Assignee: Eastman Kodak Company, Rochester, N.Y.

[21] Appl. No.: 741,906

[22] Filed: Nov. 15, 1976

[51] Int. Cl.$^2$ ............... C09B 29/26; D06P 1/18; D06P 3/54
[52] U.S. Cl. ............................................. 260/207
[58] Field of Search ....................................... 260/207

[56] References Cited

U.S. PATENT DOCUMENTS

| 3,250,763 | 5/1966 | Gies et al. | 260/207 |
| 3,637,653 | 1/1972 | Von Brachel et al. | 260/207 |

FOREIGN PATENT DOCUMENTS

| 2,234,465 | 1/1974 | Germany | 260/207 |
| 2,120,876 | 11/1971 | Germany | 260/207 |
| 1,928,372 | 2/1970 | Germany | 260/207.1 |

*Primary Examiner*—Floyd D. Higel
*Attorney, Agent, or Firm*—Donald W. Spurrell; Daniel B. Reece, III

[57] ABSTRACT

Disclosed are disperse dyes comprising a cyanodinitroaniline azo moiety and a particular group of 2(2'-alkoxy-5'-acylamidoanilino)alkane couplers. These dyes give exceptional color depth and brightness, shade permanancy on heat setting, build, leveling, barre coverage, dye exhaustion and dyeing rate on polyester fiber over widely varying dyeing conditions of for example, temperature and pressure. The dyes exhibit blue shades with excellent colorfastness properties on polyester fibers and have excellent dyeability by heat fixation (Thermosol) or exhaust (boil and pressure) methods of application on this substrate. Uniform dyeability under a wide variety of conditions is an exceptional feature of the present dyes.

7 Claims, No Drawings

DISPERSE DYES FROM 2-CYANO-4,6-DINITROANILINE AND SELECTED 2(2'-ALKOXY-5'-ACYLAMIDOANILINO)ALKANES

The present invention concerns disperse dyes comprising a cyanodinitroaniline azo moiety and a particular group of 2(2'-alkoxy-5'-acylamidoanilino)alkane couplers. These dyes give exceptional color depth and brightness, shade permanency on heat setting, build, leveling, barre coverage, dye exhaustion and dyeing rate on polyester fiber over widely diverse dyeing conditions such as temperature, pressure and dye carrier concentrations. The dyes exhibit blue shades with excellent colorfastness properties on polyester fibers, and have excellent dyeability by heat fixation or exhaust at boil and pressure on this substrate. Uniform, level and reproduceable dyeability under a wide variety of conditions is a particularly exceptional feature of the present dyes. In addition to the above, the present dyes exhibit excellent fastness to light, crocking, wash, sublimation, gas, acid and alkaline perspiration and pH stability.

The dyes of this invention are represented by the following general structure

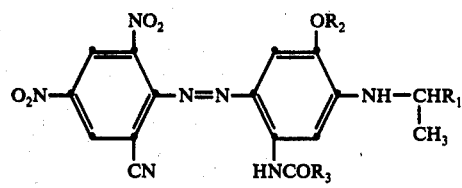

wherein $R_1$ is straight chain alkyl of 4-10 carbons or the group

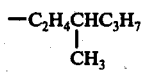

and $R_2$ and $R_3$ are selected from straight or branched alkyl of 1-4 carbons, such as methyl, ethyl, propyl, butyl, and tertiary butyl.

Polyester fibers are difficult to dye with many disperse dyes at both the boil and under pressure. For dyeing at the boil (atmospheric- 212° F.) it is necessary to complicate the process by the addition of chemical auxilliaries (carriers) to the dyebath to increase the rate of dyeing and color yield. Pressure dyeing at 220°-275° F. and thermal fixation at, for example, 400° F. circumvent the use of carriers, however, unless process parameters are strictly controlled, poor shade reproducibility is obtained with most disperse dyes. In contrast, even without close control of application parameters, the dyes of this invention give excellent shade reproducibility, excellent build-up, color yield, exhaustion of dye onto the fiber, dyeing rate, leveling (migration) and barre coverage on polyester fabrics by all of the various dyeing procedures.

The couplers of this invention can be prepared, for example, from either 2-alkoxy-5-acylamidoaniline or 2-nitro-4-acylamidoanisole and the dialkylketone with hydrogen and a catalyst as follows for the preparation of 2(2'-methoxy-5'-acetamidoanilino)hexane. A mixture of 18.0 grams (0.1 M) of 2-methoxy-5-acetamidoaniline, 100 ml of ethanol, 25.0 grams (0.2 mole) methyl-n-butyl ketone, and 3.0 grams of 5% Pt/carbon is heated at 165° C. under 1000 psi of hydrogen until the uptake of hydrogen ceases. The solvent and catalysts are removed. Hexane is added and the solid product is collected by filtration (21.0 grams - 80% yield). NMR Spectroscopy supports the proposed structure.

The dyes listed in Table 1 are readily prepared by the cyanide displacement of the corresponding bromo dyes as illustrated by the following examples.

EXAMPLE 1

A. Diazotization of 2-bromo-4,6-dinitroaniline.

To a solution of nitrosylsulfuric acid from 18.0 grams of $NaNO_2$ and 125 ml of concentrated $H_2SO_4$ is added 100 ml of 1-5 acid (1 part propionic and 5 part acetic) below 20° C. The solution is cooled to 0°-5° C. and 65.5 grams (0.25 mole) of 2-bromo-4,6-dinitroaniline dissolved in 200 ml of concentrated $H_2SO_4$ is added dropwise below 5° C. The reaction is allowed to stir at 0-5° C. for 2 hours to complete diazotization.

B. Coupling.

To a solution of 26.4 grams (0.1 mole) of 2-(2'-methoxy-5'-acetamidoanilino)hexane in 75 ml of 1-5 acid is added 250 ml (0.1 mole) of the above diazo solution with stirring below 20° C. The reaction system is allowed to stand for one hour, poured into 800 ml of water, the solids collected by filtration, washed with water, and air-dried to yield 53.7 grams (98%) of the dye:

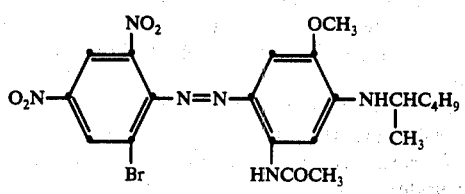

C. Cyanide Displacement

A solution of sodium dicyano cuprate $[NaCu(CN)_2]$ in dimethylformamide is added with stirring at 95°-100° C. to a solution of 52.1 g. (0.098 moles) of the above dye in 133 ml. of dimethylformamide. After addition is complete, the reaction is heated at 95°-100° C. for two hours. To the reaction is added 400 ml of isopropyl alcohol. The mixture is allowed to cool to room temperature, collected by filtration, washed well with water and air-dried to yield 42.4 grams (91%) of the dye:

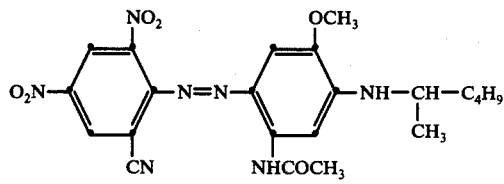

For Table I below, a series of dyes were similarly prepared and tested in order to compare color yield and shade change. In this Table, Dyes 6-10 are dyes of applicant's invention, and Dyes 1-5, and 11-13 are dyes chosen for their ostensible equivalence.

The dyes of Table 1 employed in the shade change tests are dyed at the boil from an approximate 0.67% by weight dye bath based on fabric weight in accordance with the following procedure on textured polyester fabric:

The dye (66.7 mg.) is dissolved in 10 cc. of methylcellosolve and a mixture of 200 mg. of each of sodium lignin sulfonate, and Igepon T-51 dispersant gel (sodium N-methyl-N-oleyoltaurate) then added. The volume of the bath is brought to about 300 cc. with demineralized water and 1.5 g. of Carolid (ortho-phenylphenol) carrier, 0.1 gram of each of Calgon (sodium hexametaphosphate), monosodium phosphate, and acetic acid (to adjust the pH to approximately 5 to 6), is added at 90° F. Ten grams of the fabric sample is thoroughly wet-out and placed in the dye bath. The temperature of the bath is raised at about 2° F./minute to boil and maintained at the boil for 1.5 hours. The bath is then cooled at not more than 3° F./min. The sample is then afterscoured in an aqueous solution containing 1 g./liter of soap and 1 g./liter of $Na_2CO_3$ for 20 minutes at 80° C., rinsed in water, and dried at 250° F. Each sample was divided into two parts, one being heatset at 350° F. for five minutes and the other not heatset.

The heated and unheated samples are visually rated against the Gray Scale for color change according to the procedure given in the Technical Manual of the American Association of Textile Chemists and Colorists Vol. 45, 101 (1969). A five rating represents no shade change and a one rating represents the maximum shade change. This test simulates the heat setting (350–375° F.) of dyed textured polyester fabric in the dyehouse. The purpose of this step is to add dry heat stability to the finished goods, e.g., prevent shrinkage by a hot iron. The importance of a 4–5 rating on this test is obvious.

The two samples of the dyes employed in the color yield tests were dyed on equal weights of textured polyester fabrics, one sample at the boil as above, and the other under pressure at 265° F. by the following procedure:

The dye (66.7 mg.) is dissolved in 10 cc. of methylcellosolve and a mixture of 200 mg. of each of sodium lignin sulfonate and Igepon T-51 dispersant gel (sodium N-methyl-N-oleyoltaurate) is added.

The volume of the bath is brought to about 300 cc. with demineralized water and to this bath at 90° F. is added 0.2 grams of Tanavol (trichlorobenzene carrier), 0.1 gram of each of Calgon (sodium hexametaphosphate), acetic acid (to adjust the pH to approximately 5 to 6), and monosodium phosphate.

Ten grams of the fabric sample is thoroughly wet-out and placed in the dye bath in the pressure container. The pressure container is placed into a Launder-ometer at 120° C. and rotation started. Temperature is set at 265° F. and after the Launder-ometer temperature rises to 265° F. in about 40 min. it is held for 1.5 hours, then cooled to approximately 200° F. and the pressure container removed and further cooled. The dyed fabric is afterscoured for 20 minutes at 80° C. in 1 gram/liter neutral soap and 1 gram/liter sodium carbonate, then rinsed in demineralized water and dried at 250° F.

These dyeings are visually rated against the Standard Depths according to the Society of Dyers and Colorists, 3rd Ed., p 10, Clause 10 (1961). This scale has six levels of shade depth ratings 2/1, 1/1, 1/3, 1/6, 1/12, and 1/25, with 2/1 being the deepest shade and 1/25 being the lightest shade. A dye that dyes at the same or nearly the same depth of shade rating or a 0 to 1 level difference in conjunction with a 4–5 rating on shade change with heat has utility in either boil or pressure dyeing equipment. A dye with a 4–5 rating on shade change with heat, and equal depths of shade at boil and pressure dyeing conditions is the better performer.

Discussion of Table 1

The results of the testing were not predictable in that minute changes in $R_4$ and/or $R_5$ were not expected to affect the dyeing performance of color yield, shade change with heat, exhaustion, and rate of dyeing on polyester fibers. From Table 1, it is seen that the molecular weight of the alkyl radical for $R_4$ and $R_5$ and its molecular arrangement can affect the dyeing properties on polyester fibers. The color yield and shade change are not altered for example, by adding a —$CH_2$— to dye 2 to yield dye 3. The most surprising change is noted by comparing dyes 4 and 6. These dyes are actually isomers, $C_{22}H_{25}N_7O_6$, but remarkably under the same conditions, dye 6 dyes three times heavier (3 levels) at the boil than dye 4 with a great decrease in shade change from 2 to 4–5. The same trend is observed in comparing dye 6 to dye 11 which is two hydrogen atoms less than dye 6. These outstanding dyeing properties insure that these dyes will perform well by all methods of applications to polyester fabrics. It is apparent that dye 6 is an outstanding and highly preferred dye of this invention.

TABLE I

[Structure: $O_2N$-substituted phenyl with $NO_2$ and $CN$ groups, —N=N— linked to phenyl with $OCH_3$ and $HNCOCH_3$ groups, bearing $-N(R_4)(R_5)$]

| Dye | $R_4$ | $R_5$ | Color Yield Boil (212° F.) | Color Yield Pressure (265° F.) | Δ* | Shade Change - Heat (350° F. - 5 Min.) Boil Dyeings |
|---|---|---|---|---|---|---|
| 1 | —$C_2H_5$ | —$C_2H_5$ | 1/6 | 1/3 | 1 | 3 |
| 2 | H | —CH(CH$_3$)—CH$_3$ | 1/6 | 1/1 | 2 | 3 |
| 3 | H | —CH(CH$_3$)—C$_2$H$_5$ | 1/6 | 1/1 | 2 | 3 |
| 4 | H | —CH(CH$_3$)—CH$_2$—C(H)(CH$_3$)—CH$_3$ | 1/6 | 2/1 | 3 | 2 |

TABLE I-continued

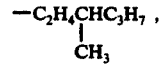

| Dye | R$_4$ | R$_5$ | Color Yield Boil (212° F.) | Pressure (265° F.) | Δ* | Shade Change - Heat (350° F. - 5 Min.) Boil Dyeings |
|---|---|---|---|---|---|---|
| 5 | H | —CH(CH$_3$)—C$_2$H$_4$—C(CH$_3$)$_2$H | 1/3 | 1/1 | 1 | 3 |
| 6 | H | —CH(CH$_3$)—C$_4$H$_9$ | 2/1 | 2/1 | 0 | 4–5 |
| 7 | H | —CH(CH$_3$)C$_2$H$_4$—C(CH$_3$)(H)—C$_3$H$_7$ | 1/3 | 1/1 | 1 | 4–5 |
| 8 | H | —CH(CH$_3$)—C$_6$H$_{13}$ | 1/3 | 1/1 | 1 | 4–5 |
| 9 | H | —CH(CH$_3$)—C$_8$H$_{17}$ | 1/3 | 1/1 | 1 | 4–5 |
| 10 | H | —CH(CH$_3$)—C$_{10}$H$_{21}$ | 1/3 | 1/1 | 1 | 4–5 |
| 11 | H | (tetrahydrothiopyranyl, S) | 1/6 | 2/1 | 3 | 1 |
| 12 | H | —CH$_2$C$_6$H$_5$ | 1/6 | 1/1 | 2 | 2 |
| 13 | H | —C$_3$H$_6$C$_6$H$_5$ | 1/6 | 1/1 | 2 | 3 |

*Δ = Difference in Color Yield Levels.

The invention has been described in detail with particular reference to preferred embodiments thereof, but it will be understood that variations and modifications can be effected within the spirit and scope of the invention.

I claim:
1. A compound of the formula

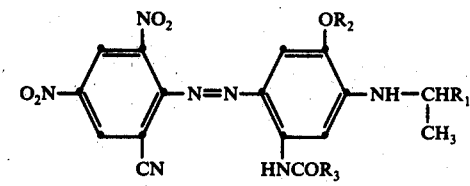

wherein R$_1$ is straight chain alkyl of 4–10 carbons or the group $$-C_2H_4\underset{\underset{CH_3}{|}}{C}HC_3H_7,$$

and R$_2$ and R$_3$ are selected from straight or branched alkyl of 1–4 carbons.

2. A compound of claim 1 wherein R$_1$ is —C$_4$H$_9$.
3. A compound of claim 2 wherein R$_2$ and R$_3$ are both —CH$_3$.
4. A compound of claim 1 wherein R$_1$ is $$-C_2H_4-\underset{\underset{CH_3}{|}}{C}HC_3H_7.$$

5. A compound of claim 1 wherein R$_1$ is —C$_6$H$_{13}$.
6. A compound of claim 1 wherein R$_1$ is —C$_8$H$_{17}$.
7. A compound of claim 1 wherein R$_1$ is —C$_{10}$H$_{21}$.